Oct. 25, 1927.
G. A. VLASAK
1,646,776
AUTOMOBILE BUMPER
Filed Nov. 17, 1926
2 Sheets-Sheet 1
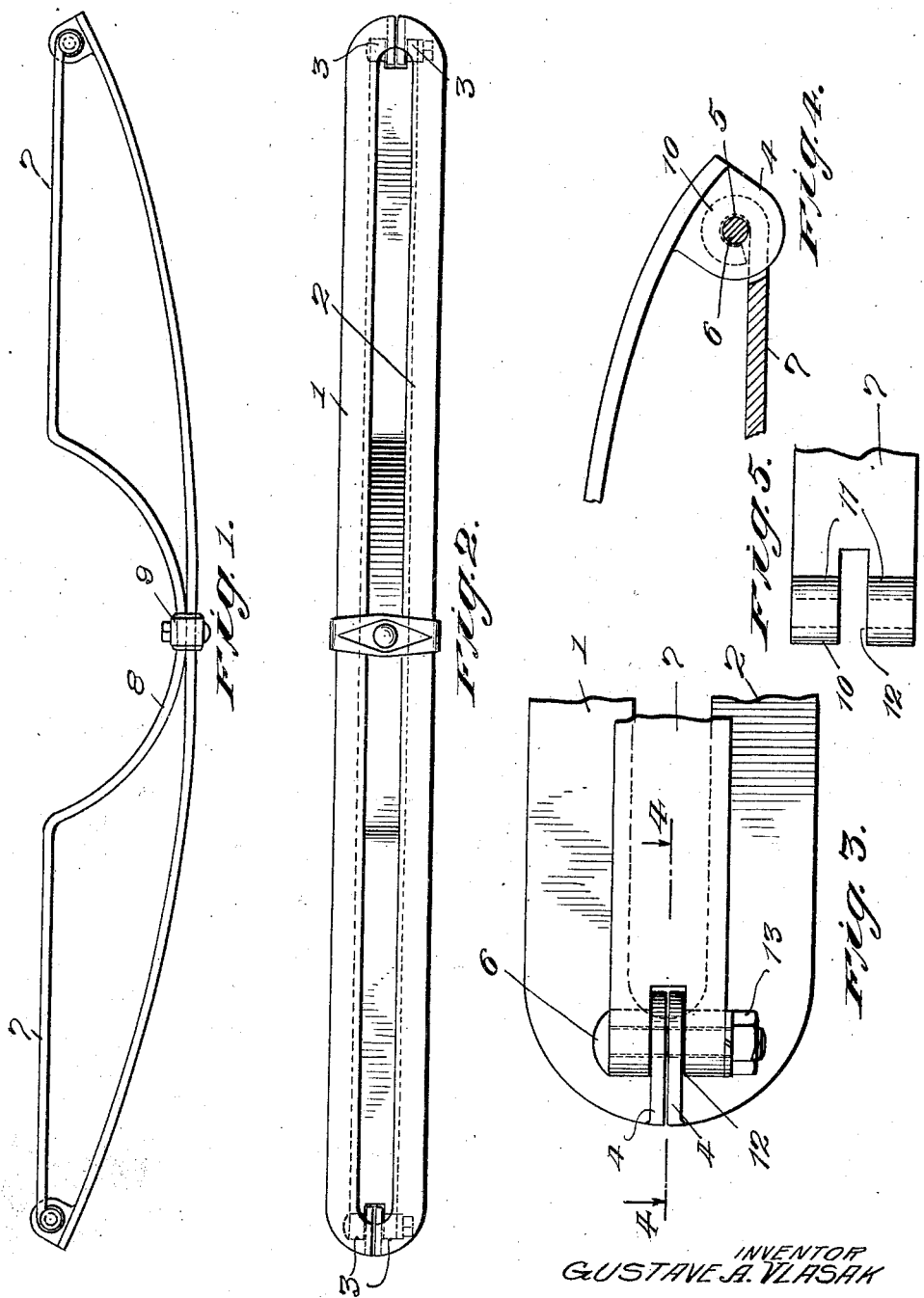
INVENTOR
GUSTAVE A. VLASAK
BY
Hammond & Littell
ATTORNEYS Oct. 25, 1927.
G. A. VLASAK
1,646,776
AUTOMOBILE BUMPER
Filed Nov. 17, 1926    2 Sheets-Sheet 2
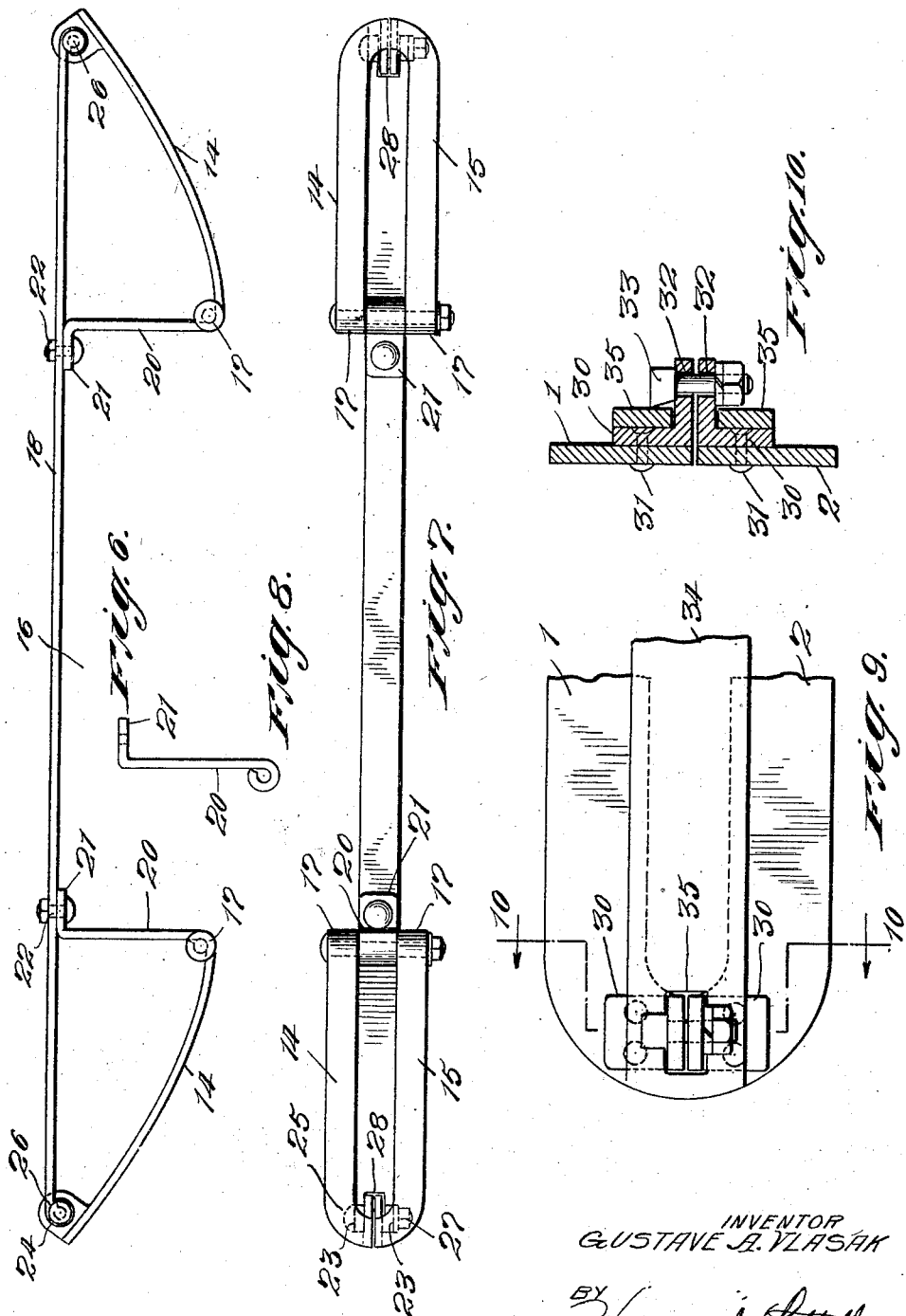
INVENTOR
GUSTAVE A. VLASAK
BY
Hammond & Littell
ATTORNEYS Patented Oct. 25, 1927.

1,646,776

UNITED STATES PATENT OFFICE.

GUSTAVE A. VLASAK, OF NEW YORK, N. Y.

AUTOMOBILE BUMPER.

Application filed November 17, 1926. Serial No. 148,868.

This invention relates to an improvement in bumpers for automobiles and other motor driven vehicles.

The purpose and object of the invention is to simplify the manufacture and reduce the cost of automobile bumpers, at the same time providing a stronger bumper of more attractive appearance, than those at present on the market.

Another object of the invention is to provide a plural impact bar automobile bumper with means for pivotally connecting the parts thereof which will securely hold the same against separation and rattling and which will be of low cost and easy to assemble.

Another object of the invention is to provide a plural impact bar automobile bumper, in which the impact members are secured and held together between portions of the back bar.

Other objects and advantages of the invention will appear as the description of the invention proceeds.

Referring now to the drawings, which show various possible forms and modifications of my inventions:

Figure 1 is a plan view of an automobile front bumper, constructed in accordance with my invention;

Figure 2 is a front view of the bumper shown in Figure 1;

Figure 3 is a rear view of one end of the bumper, shown in Figure 2, showing the means of connecting the impact bars and the back bar together;

Figure 4 is a sectional view on the line 4—4 of Figure 3;

Figure 5 is a view of one end of the back bar;

Figure 6 is a plan view and Figure 7 is a face view of a rear bumper or fender guard constructed in accordance with my invention;

Figure 8 is a detail view of a portion of the bumper of Figure 6;

Figure 9 is a view of one end showing a modified form of connection between the impact portions of the back bar; and Figure 10 is a sectional view on the line 10—10 of Figure 9.

In the form of embodiment of the invention illustrated in Figures 1 to 5, the bumper comprises two spaced front impact bars 1 and 2, each of which is bent or curved toward the other at each end as indicated at 3, forming an oval-shaped impact portion when assembled. Each end of the bars 1 and 2 is provided at the extremity thereof with rearwardly turned ears 4, which are preferably integral with the front impact bars 1 and 2. The ears 4 are provided with an opening 5, adapted to receive the tie bolt 6, for securing the two impact bars together and attaching them to the back bar portion 7. The back bar 7, preferably extends from end to end of the impact bars 1 and 2, and is provided with an arched center 8, secured to the impact bars 1 and 2 by means of a suitable ornamental clip 9, thereby forming a truss support increasing the strength of the impact bars 1 and 2 and increasing their resistance to shock and impact. It will be understood, however, that the back bar 7 need not extend from end to end of the impact portion, but that this bar may be made in two separate parts, one end of which is secured at the end of the impact bars and the other end being clipped to the impact bars 1 and 2 between the end and center thereof if desired. The ends of the impact bars 7 are turned as indicated at 10 to form eyes 11, and a slot 12 is cut thru the turned portions 10 at approximately the center thereof. The ears 4 on the impact bars 1 and 2 are then inserted in the slots 12, the tie bolt 6 inserted thru the eyes and thru the perforations 5 in the ears 4 and all of the parts are drawn together by means of a nut 13, thereby securely holding the two front bars against separating as well as securing the front bars and back bar together.

It will be readily apparent that by this construction, a bumper having the general appearance, strength and resistance of those now in use may be produced at a much lower manufacturing cost than the present form of bumper, wherein an eye is formed at each end of each impact bar and eyes are formed at the ends of back bar and the parts of the bumper secured together by a long tie bolt extending thru the three eyes. The impact bars 1 and 2 with integral ears 4 extending therefrom may be very quickly and conveniently formed from plain stock by simply bending the portions thereof and when the ears 4 are punched forming holes 5, the parts of the bumper may be assembled with less labor than in the present construction.

Figure 6, 7 and 8, show the same principle of construction applied to the making of rear bumpers or fender-guards. In this embodiment of the invention, short impact portions 14 and 15 are provided on each side of the bumper structure, leaving space 16 between the same for receiving the spare tire. The impact members 14 and 15 are each provided at their inner ends with a turned eye 17 and are connected to the back bar 18 of this bumper by means of a strut 20, having a bent end 21 resting against the back bar and secured thereto by means of bolts 22. At the outer ends the impact members 14 and 15 are curved as indicated at 23 and are provided with integral laterally extending ears 24 suitably perforated to receive the tie bolt 25 which extends thru corresponding eyes 26 of the back bar 18 having slots 28 therein as in the previous form of construction. At the end of the back bar portion 18, a nut 27 on the tie bolt 25 permits all these parts to be drawn into firm contact so as to preserve the rigidity of the bumper and prevent rattling thereof.

Figures 9 and 10 show a modified form of connection, in which the impact bars 1 and 2 are provided with separate angle brackets 30 secured thereto by means of bolts 31 or by means of spot welding or in any other suitable manner. The laterally turned ends of the bracket 30 are provided with perforations 32 adapted to receive the wedge bolt 33 and the back bar member 34 is provided with a rectangular opening 35 therein, thru which the rear portions of the angle ears 30 project, so that when the wedge bolt 33 is drawn home, the back bar is forced into firm contact with the impact bars, the ends of the impact bars drawn together and a firm assembly produced.

While I have described several forms of embodiment of my invention, it is to be understood that various modifications and changes may be made in the form illustrated without departing from the invention or the scope of the appended claims.

What I claim as my invention is:

1. An automobile bumper comprising a pair of front impact bars and a back bar, a slotted eye at each end of the back bar, means for connecting said bars together at the ends thereof, comprising laterally turned ears on the impact bars fitting into said slotted eyes in the back bar and a tie bolt extending through said eye and ears.

2. An automobile bumper, comprising a pair of spaced impact bars and a back bar, means for connecting said bars together at the ends thereof, comprising a slotted eye in the back bar, means on the front bars extending into said slot, and means extending through said eye and slot to secure the parts together.

3. An automobile spring bumper, comprising impact bars and a back bar narrower than the width of the impact bars, an eye in each end of the back bar, a slot through the eye, means on the impact bars extending into said slot and means to secure said means in said slot.

4. An automobile bumper, comprising spaced impact bars and a back bar, laterally projecting ears on the impact bars, slots in the back bar adapted to receive said ears, and means for securing said ears in said slots.

5. An automobile bumper comprising spaced impact bars, and a back bar, said impact bars being curved toward each other at the ends forming an oval impact surface, an ear extending laterally from each end of the impact bars, a slot in each end of the back bar to receive said ears, and means to hold said ears in said slots.

6. An automobile bumper comprising spaced impact bars, and a back bar, said impact bars being curved toward each other at the ends forming an oval impact surface, an ear extending laterally from each end of the impact bars with the ears of one impact bar contacting with the ears of the other impact bar, a slot in each end of the back bar to receive said ears, means to hold said ears in said slots, a forwardly bent arch in said back bar and means to connect said arch to the impact bars at the center thereof.

In testimony whereof I have affixed my signature to this specification.

GUSTAVE A. VLASAK.